United States Patent [19]

Raffel et al.

[11] 4,200,603

[45] Apr. 29, 1980

[54] PROCESS AND EQUIPMENT FOR THE CONTINUOUS PRODUCTION OF BLOCK-SHAPED FOAM

[75] Inventors: Reiner Raffel, Siegburg; Günter Hauptmann, Odenthal; Gerd Reffelmann, Overath; Wilfried Ebeling, Cologne, all of Fed. Rep. of Germany

[73] Assignee: Maschinenfabrik Hennecke GmbH, Leverkusen, Fed. Rep. of Germany

[21] Appl. No.: 954,048

[22] Filed: Oct. 23, 1978

[30] Foreign Application Priority Data

Oct. 29, 1977 [DE] Fed. Rep. of Germany ....... 2748733

[51] Int. Cl.² .............................................. B29D 27/04
[52] U.S. Cl. .................................... 264/51; 264/45.5; 264/331; 264/DIG. 14; 264/DIG. 65; 264/DIG. 84; 425/115; 425/224; 425/329; 425/817 C
[58] Field of Search ................... 264/54, DIG. 84, 51, 264/DIG. 65, 331, 45.5, DIG. 14; 425/817 C, 115, 224, 329

[56] References Cited

U.S. PATENT DOCUMENTS

| | | | |
|---|---|---|---|
| 2,957,207 | 10/1960 | Roop et al. | 264/54 |
| 3,047,449 | 7/1962 | Coble | 264/54 X |
| 3,124,627 | 3/1964 | Hood | 264/54 |
| 3,129,270 | 4/1964 | Hood | 264/54 |
| 3,786,122 | 1/1974 | Berg | 264/54 X |
| 3,870,441 | 3/1975 | Petzetakis | 264/DIG. 84 |
| 4,026,979 | 5/1977 | Palomares | 264/DIG. 84 |
| 4,080,125 | 3/1978 | Vinas | 264/DIG. 84 |

*Primary Examiner*—Philip Anderson
*Attorney, Agent, or Firm*—Joseph C. Gil; Gene Harsh

[57] ABSTRACT

The instant invention is directed to a process for the continuous production of block-shaped foam and to the equipment used therefore. The process of the invention broadly involves the heating of the bottom film prior to application of the foamable mixture. In this way, the undesirable crust generally formed on the bottom of the foam blocks is substantially reduced and/or eliminated.

7 Claims, 2 Drawing Figures

PROCESS AND EQUIPMENT FOR THE CONTINUOUS PRODUCTION OF BLOCK-SHAPED FOAM

BACKGROUND OF THE INVENTION

Process and equipment for the continuous production of block-shaped foam, and particularly polyurethane foams wherein a liquid reaction mixture is applied to a moving bottom film and allowed to foam are known in the art. The art has generally used equipment consisting of a conveyor belt provided with side walls, and a take-off station for the bottom film as well as a device to apply the mixture to the film, located at the starting side of the belt.

Foam blocks produced according to the above technique generally have a hardened layer directly above the bottom film of a density that is 10 to 20 times higher than that of the remaining foam. The thickness of this layer, or crust, is generally between 2 and 5 mm, depending on the composition of the reaction mixture as well as on the operating conditions of the equipment. Commercially, the foam blocks produced have a height of approximately 1 meter. The volume reduction due to the hardened layer is generally only 0.2 to 0.5%. However, due to the very high density of this layer, losses of approximately 1 to 5% are incurred, based on the total amount of foam block produced. In extreme cases, these losses may amount up to 10% by weight. Generally, to determine the economic feasibility of a foam block production line, an average loss caused by the hardened layer of 3.0% by weight is assumed.

It is known that the thickness of the hardened layer can be reduced by applying the reaction mixture to the bottom film in a condition where the reaction has already started, that is, by applying an already occurring foam reaction. For this purpose, the conveyor belt travels on a downward-sloping surface. Before the conveyor belt is an overflow container into which the reaction mixture is fed from the bottom. This overflow container is provided so that the reaction mixture inside starts to react as the foam rises to the top. On top of the overflow container, the foamable mixture has already started to foam, which foam is then carried along the slanted surface and continues to foam there. Characteristic of this technique are the processes described in U.S. Pat. Nos. 3,786,122, and 3,870,441. This process has the disadvantage that gas bubbles locked into the reaction mixture can no longer escape through the surface, since the completely reacted foam has such a toughness that the gas bubbles cannot penetrate it. Therefore, the bubbles remain in the foam bun as undesired faults. Another disadvantage of this process is there is no compatibility for all the various reaction mixtures commonly used today.

The purpose of the invention is to provide foam buns with improved homogeneity in the bottom area, wherein the hardened layer is entirely eliminated or, at least, where its thickness is substantially decreased.

BRIEF DESCRIPTION OF THE DRAWINGS

The inventive equipment is shown in the drawing purely as a schematic and is explained in the following.

DESCRIPTION OF THE INVENTION

Figure 1:
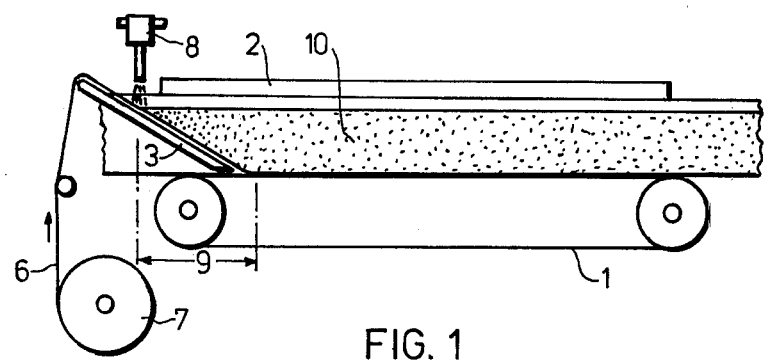
FIG. 1: Side view of the equipment.
Figure 2:
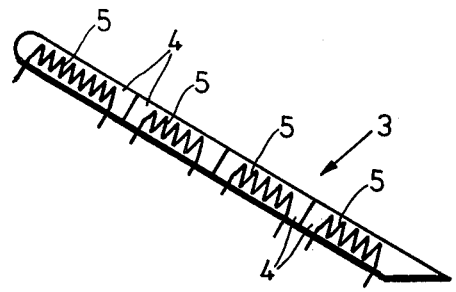
FIG. 2: Heating device, enlarged side view.

The processing problem noted above has been solved according to the invention by preheating the bottom film prior to applying the reaction mixture. This has the result that the heat created during the reaction is no longer transferred through the bottom film onto the conveyor belt or onto any other surface. This temperature drop in the applied mixture layer was apparently the reason for the formation of the hardened layer. It is to be understood that the heating should be applied over the area of the bottom film where the formation of the hardened layer is to be avoided or where the thickness of the crust is to be decreased. This is generally the entire width.

The preheating is preferably continued until the reaction heat develops. Upon discontinuation of the heating from the outside, the cooling of the bottom film is avoided by the developing reaction heat, so that the bottom film remains at an elevated temperature until the completion of the foaming.

According to the inventive process, the bottom film is preferably preheated to a temperature of 30 to 120° C., preferably to 40° to 90° C. The preferred temperature range will be useful with most of today's commonly used reaction mixture recipes and the operating conditions of the equipment. The broader temperature range will be as useful as most other recipes. Of course, some special recipes or operating conditions may require temperatures exceeding that broad temperature range.

According to a preferred embodiment of the process, the preheating is conducted in several steps of varying temperatures.

This embodiment improves the temperature consistency. The temperature can then be more easily adjusted to the progressing reaction conditions.

The equipment of the invention is characterized in that a heating element is provided upstream of the mixture application device on the conveyor line. The location of the heating device depends on the desired temperature, the advance speed of the conveyor belt, the heat conductibility or the heat insulation of the machine parts that come in contact with the bottom film, as well as the amount of the reaction mixture and its physical properties. The heating device can be designed in various ways. The heating of the bottom film can be done directly or indirectly, such as for example by infrared rays, hot air heat, electrical heating or by heating devices using hot liquids, vapors or gases. The most preferred heating device is an electrically heatable plate, across which plate the bottom film travels. To avoid heat losses to other equipment parts, the heating device can be insulated. If desired, the approach and exit areas of the bottom film boardering on the heating device can also be insulated.

The bottom and/or side film is preferably of paper or of a plastic foil.

In a particularly preferred embodiment, the heating device extends into the area of the reaction zone. Thus, heat is applied while the heat that is created during the reaction slowly develops.

According to another preferred embodiment, the heating device consists of several sections. The adjustment and control of equipment to particular production conditions is significantly improved by varying temperatures of the sections.

The equipment of the invention comprises a conveyor belt (1) provided with side walls (2). Located at the inlet area of the conveyor belt is the heating device (3) (in the drawings, shown as a plate). The heating device (3) consists of several sections (4). Each section has a separately connected heating coil (5). The bottom film (6) is drawn from a take-off station (7). Downstream from the area of the heating device (3) is a mixture application device (8). The reaction zone is shown as (9), and the foamed bun as (10).

The invention is further illustrated but is not intended to be limited by the following examples in which all parts and percentages are by weight unless otherwise specified.

EXAMPLES

Example 1

A block of polyurethane foam was continuously produced according to the following reaction mixture recipe:

100 pbw—polyether trimethylol propane, propyleneoxide and ethylene oxide with an OH number 49 and containing predominant amounts of secondary OH groups;

1 pbw—commercially available polyether polysiloxane (stabilizer) [L 520 of UNION CARBIDE CORP., U.S.A.];

0.15 pbw—tertiary amine [diaza-bicyclo-(2.2.0)-octane of HOUDRY CORP., U.S.A.];

0.25 pbw—tin dioctate;

50 pbw—of a mixture of 80 weight-% 2.4- and 20 weight-% 2.6-diisocyanatotoluene;

4 pbw—water.

The equipment used was substantially similar to that shown in the drawings. The bottom paper is at room temperature (i.e., 24°), when fed into the heating area. The operating data of the block foam equipment was as follows:

Advance speed of the conveyor belt: 2.7 m/min
Width of mixture application (block width): 1.20 m
Slope of conveyor belt: 5°
Reaction mixture application rate: 30 kg/min
Length of heating device: 2.70 m
Width of heating device: 1.20 m
Heating medium: oil
Heating capacity: 9 kW
Temperature of bottom paper through heating: 61° C.

The mixture application device is arranged in reference to the heating device so that the heating device extends 1 meter into the reaction zone, that is, 1.70 m length of the heating device is upstream of the mixture application device.

An approximately 52 cm high foam block is obtained that has substantially no hardened layer. Referring to the total weight of foam, the loss from the small amount of bottom film produced is 1.0% by weight.

Comparison Example

Under the same conditions as in Example 1, however, a second foam block was produced without preheating the bottom paper.

An approximately 50 cm high block was obtained, which had a hardened layer of 2 mm thickness in the bottom area. Based on the total amount of foam, the loss was 3.5% by weight compared to 1% in Example 1.

Example 2

Using equipment similar to that of Example 1, a block of polyurethane foam was continuously produced according to the following reaction mixture recipe:

100 pbw—polyether from trimethylol propane, propyleneoxide and ethyleneoxide with an OH number of 49 and containing predominant amounts of secondary OH-groups;

1.6 pbw—commercially available polyether polysiloxane (stabilizer) [L 520 of UNION CARBIDE CORP., U.S.A.];

0.15 pbw—tertiary amine [diaza-bicyclo-(2.2.0)-octane of HOUDRY CORP., U.S.A.];

0.3 pbw—tin dioctate;

20 pbw—monofluore trichloromethane;

50 pbw—of a mixture from 80 weight-% 2.4 -and 20 weight-% 2.6diisocyanatotoluene;

4 pbw—water.

The bottom paper was at room temperature (i.e., 24° C.) when fed into the heating area. The operating data of the block foam equipment was as follows:

Advance speed of the conveyor belt: 2.5 m/min
Width of mixture application (block width): 1.20 m
Slope of conveyor belt: 5°
Reaction mixture application rate: 30 kg/min
Length of heating device: 2.70 m
Width of heating device: 1.20 m
Heating medium: oil
Heating capacity: 8 kW
Temperature of bottom paper through heating: 70° C.

The mixture application device is arranged relative to the heating device so that the heating device extends 1 m into the reaction zone; that is, a 1.70 m length of the heating device is upstream of the mixture application device.

An approximately 65 cm high foam bun is obtained that has a hardened layer of approximately 2 mm thickness. Based on the total foam quantity, the loss is 4.3% by weight.

COMPARISON EXAMPLE

The experiment was performed under the same conditions as in Example 2, however, without preheating the bottom paper.

An approximately 62 cm high block was obtained that had a 4 mm thick hardened layer. Based on the total foam amount, the loss was 9.1% by weight.

Although the invention has been described in detail for the purpose of illustration, it is to be understood that such detail is solely for that purpose and that variations can be made therein by those skilled in the art without departing from the spirit and scope of the invention except as it may be limited by the claims.

What is claimed is:

1. In a process for the continuous production of block-shaped foam wherein a liquid reaction mixture is applied to a moving bottom film upon which the mixture freely foams, the improvement wherein the bottom film is heated prior to the application of the reaction mixture, and wherein the heating is continued until the development of reaction heat from the reaction mixture.

2. The process of claim 1, characterized in that the bottom film is heated to a temperature of 30° to 120° C.

3. The process of claim 2, characterized in that the bottom film is heated to a temperature of 40° to 90° C.

4. The process of claim 1, characterized in that the heating is conducted in several steps of varying temperature.

5. The process of claim 1, wherein the foam is a polyurethane foam.

6. Apparatus for the production of block-shaped foam, comprising a conveyor belt provided with side walls, a feed-in station for a bottom film upstream of said belt, a mixture application device arranged at the start of the conveyor belt, and a heating device provided for the bottom film which extends upstream of the mixture application device, and downstream of the mixture application device.

7. The apparatus of claim 6, characterized in that the heating device comprises an electrically heatable plate consisting of several sections, each section being controllably heatable.

* * * * *

UNITED STATES PATENT AND TRADEMARK OFFICE
CERTIFICATE OF CORRECTION

PATENT NO. : 4,200,603
DATED : April 29, 1980
INVENTOR(S) : Reiner Raffel, Günter Hauptmann, Gerd Reffelmann, Wilfried Ebeling It is certified that error appears in the above—identified patent and that said Letters Patent is hereby corrected as shown below:

First page, block 73 please correct the Assignee to read:

Maschinenfabrik Hennecke GmbH,
    Leverkusen, Fed. Rep. of Germany    AND

Bayer Aktiengesellschaft
    Leverkusen, Fed. Rep. of Germany column 2, line 56, please correct the spelling of --bordering-- column 3, line 32, please correct the spelling of --dioctoate-- column 4, line 15, please correct the spelling of --dioctoate--; same column, line 16, please correct the
   spelling of --monofluoro--;
same column, line 18, please correct the form of
                                           --2,6-diisocyanatotoluene--

Signed and Sealed this

Twentieth Day of September 1983

[SEAL]

Attest:

GERALD J. MOSSINGHOFF

Attesting Officer        Commissioner of Patents and Trademarks